(12) United States Patent  
Kalafut et al.

(10) Patent No.: US 12,007,359 B2
(45) Date of Patent: Jun. 11, 2024

(54) COMPENSATION VOLTAGE ADJUSTMENT FOR ION MOBILITY SEPARATION

(71) Applicant: Thermo Finnigan LLC, San Jose, CA (US)

(72) Inventors: Bennett S. Kalafut, San Jose, CA (US); Dhruva D. Kulkarni, San Jose, CA (US); Satendra Prasad, San Jose, CA (US); Michael W. Belford, Los Altos, CA (US)

(73) Assignee: Thermo Finnigan LLC, San Jose, CA (US)

( * ) Notice: Subject to any disclaimer, the term of this patent is extended or adjusted under 35 U.S.C. 154(b) by 211 days.

(21) Appl. No.: 17/303,429

(22) Filed: May 28, 2021

(65) Prior Publication Data

US 2022/0381735 A1 Dec. 1, 2022

(51) Int. Cl.
*H01J 49/22* (2006.01)
*G01N 27/624* (2021.01)
*H01J 49/00* (2006.01)
*H01J 49/02* (2006.01)

(52) U.S. Cl.
CPC ........ *G01N 27/624* (2013.01); *H01J 49/0031* (2013.01); *H01J 49/022* (2013.01)

(58) Field of Classification Search
CPC ... G01N 27/624; H01J 49/0031; H01J 49/022
USPC .................................................. 250/281, 282
See application file for complete search history.

(56) References Cited

U.S. PATENT DOCUMENTS

2008/0017791 A1* 1/2008 Wilks ................... G01N 27/624
250/282

* cited by examiner

*Primary Examiner* — Michael Maskell

(57) ABSTRACT

Adjusting compensation voltage (CV) parameters of an ion mobility device is described. In one instance, the CV parameters are adjusted to reflect a different CV range, a number of CV steps, or a CV step size to increase throughput of a mass spectrometer.

22 Claims, 5 Drawing Sheets

COMPENSATION VOLTAGE ADJUSTMENT FOR ION MOBILITY SEPARATION

TECHNICAL FIELD

This disclosure relates to mass spectrometry, and more particularly to adjusting compensation voltages used in ion mobility separation to improve throughput.

BACKGROUND

A current focus of biological mass spectrometry is the identification, quantification, and structural elucidation of peptides, proteins, and related molecules. In the context of bottom-up proteomics experiments, proteins are subject to proteolytic digestion to break down into fragments of peptides which are then separated, usually with liquid chromatography (LC), before being introduced into an ion source of a mass spectrometer. Typically, the ion source for proteomics experiments implements electrospray ionization (ESI) to ionize the peptide.

An ion mobility separation device, such as field asymmetric-waveform ion-mobility spectrometry (FAIMS) device, can be positioned downstream from the ESI, but before the mass analyzer, to separate the ions in accordance with their differential mobility. A range of compensation voltages (CVs) is applied to the FAIMS device to facilitate the transit of desirable ions through the FAIMS device while undesirable ions are not allowed to exit under the applied CVs.

However, the optimal CVs that facilitate the transmission of the desirable ions might change, particularly when solvent clusters enter the FAIMS device during high flow rates. Additionally, other changing other parameters such as position of the ESI emitter, composition of the sample, or chromatographic parameters also change the optimal CVs.

SUMMARY

One innovative aspect of the subject matter described in this disclosure includes a mass spectrometry system having an ionization source configured to receive a sample and form ions from the sample; a field asymmetric-waveform ion-mobility spectrometry (FAIMS) device configured to receive the ions; and a controller configured to acquire peak information related to transmission of the ions through the FAIMS device based on initial compensation voltage (CV) parameters used for the FAIMS device, and the controller configured to adjust the initial CV parameters based on the peak information to generate adjusted CV parameters used by the FAIMS device, the adjusted CV parameters being one or more of: a CV range different than the initial CV parameters, a number of CV steps within the CV range different than the initial CV parameters, or a CV step size between CV values of the CV range different than the initial CV parameters.

In some implementations, the adjusted CV parameters includes a narrower CV range than the initial CV parameters.

In some implementations, the adjusted CV parameters includes a smaller CV step size than the initial CV parameters.

In some implementations, the adjusted CV parameters includes more steps within the CV range than the initial CV parameters.

In some implementations, the controller is further configured to apply a time delay based on the CV step size.

In some implementations, the controller is further configured to generate a scan schedule ordering scans based on the adjusted CV parameters.

In some implementations, the scan schedule is ordered based on ascending or descending CV values of each of the scans within an overlapping retention time window.

In some implementations, the scan schedule includes a first scan having a first CV value within the CV range, and a second scan having a second CV value within the CV range, and the controller is configured to determine that the first CV value and the second CV value are within a threshold range of each other, and the controller is configured to modify one or both of the first CV value or the second CV value to be the same as the other.

Another innovative aspect of the subject matter described in this disclosure includes a method of operating a mass spectrometer including: acquiring, by a processor, peak information indicative of transmissions of ions through an ion mobility device using first compensation voltage (CV) parameters; determining, by the processor, second CV parameters based on the peak information, the second CV parameters being different from the first CV parameters by one or more of: a CV range, a number of CV steps within the CV range, or a CV step size between CV values of the CV range; applying the second CV parameters to the ion mobility device; and acquiring mass spectra using the ion mobility device applied with the second CV parameters.

In some implementations, the CV range of the second CV parameters is smaller than the CV range of the first CV parameters.

In some implementations, the CV step size of the second CV parameters is smaller than the CV step size of the first CV parameters.

In some implementations, the number of CV steps within the CV range of the second CV parameters is more than the number of CV steps of the first CV parameters.

In some implementations, applying the second CV parameters to the ion mobility device includes applying a time delay before acquisition of the mass spectra, the time delay based on the CV step size.

In some implementations, the method includes generating a scan schedule ordering scans based on the second CV parameters, the scan schedule ordering scans based on ascending or descending CV values of each of the scans within an overlapping retention time window, and wherein acquiring the mass spectra is based on the scan schedule.

In some implementations, the scan schedule includes a first scan having a first CV value within the CV range, and a second scan having a second CV value within the CV range, and generating the scan schedule includes: determining that the first CV value and the second CV value are within a threshold range; and modifying one or both of the first CV value or the second CV value to be the same as the other.

Another innovative aspect of the subject matter described in this disclosure includes a mass spectrometry system including: an ion mobility device configured to transmit ions; and a controller circuit configured to acquire transmission information indicative of the ions transmitting through the ion mobility device based on use of first compensation voltage (CV) parameters, configured to generate second CV parameters different than the first CV parameters, and configured to use the second CV parameters to facilitate the transmission of the ions through the ion mobility device, the second CV parameters being different than the first CV parameters by one or more of: a CV range, a number of CV steps within the CV range, or a CV step size among CV values used within the CV range.

In some implementations, the CV range of the second CV parameters is narrower than the CV range of the first CV parameters.

In some implementations, the CV step size of the second CV parameters is smaller than the CV step size of the first CV parameters.

In some implementations, the number of CV steps of the second CV parameters is higher than the number of CV steps for the first CV parameters.

In some implementations, the controller circuit is further configured to acquire a mass spectrum of the ions transmitting through the ion mobility device following a time delay applied that has a magnitude based on the CV step size of the second CV parameters.

In some implementations, the controller circuit is further configured to generate a scan schedule ordering scans based on the second CV parameters.

In some implementations, generating the scan schedule includes: identifying scans within the scan schedule having overlapping retention time windows; identifying CVs of the scans identified as having overlapping retention time windows; and reordering the scan schedule based on the identification of the CVs.

In some implementations, reordering the scan schedule includes ordering the scans based on ascending or descending CV values.

In some implementations, the scan schedule includes a first scan having a first CV value within the CV range, and a second scan having a second CV value within the CV range, and the controller is configured to determine that the first CV value and the second CV value are within a threshold range, and the controller is configured to modify one or both of the first CV value or the second CV value based on the determination that the first CV value and the second CV value are within the threshold range.

Another innovative aspect of the subject matter described in this disclosure includes a computer program product including one or more non-transitory computer-readable media having computer programs instructed stored therein, the computer program instructions being configured such that, when executed by one or more computing devices, the computer program instructions cause the one or more computing devices to: acquire peak information indicative of transmissions of ions through an ion mobility device using first compensation voltage (CV) parameters; determine second CV parameters based on the peak information, the second CV parameters being different from the first CV parameters by one or more of: a CV range, a number of CV steps within the CV range, or a CV step size between CV values of the CV range; apply the second CV parameters to the ion mobility device; and acquire mass spectra using the ion mobility device applied with the second CV parameters.

Another innovative aspect of the subject matter described in this disclosure includes a mass spectrometry system including: an ion mobility device configured to transmit ions; and a controller circuit configured: apply a first compensation voltage (CV) to the ion mobility device to transmit first ions, determine that the ion mobility device should switch from the first CV to a second CV to facilitate transmission of second ions, determine a first CV step size representing a voltage difference between the first CV and the second CV, apply the second CV to the ion mobility device, and acquire mass spectra representative of the second ions upon or following a first time delay based on the first CV step size.

In some implementations, the controller circuit is further configured to: determine that the ion mobility device should switch from the second CV to a third CV to facilitate transmission of third ions, determine a second CV step size representing a voltage difference between the second CV and the third CV, apply the third CV to the ion mobility device, and acquire mass spectra representative of the third ions upon or following a second time delay based on the second CV step size, wherein the first CV step size is smaller than the second CV step size, and the first time delay is smaller than the second time delay.

In some implementations, the first time delay is further based on a history of prior CVs.

DETAILED DESCRIPTION

Figure 1:
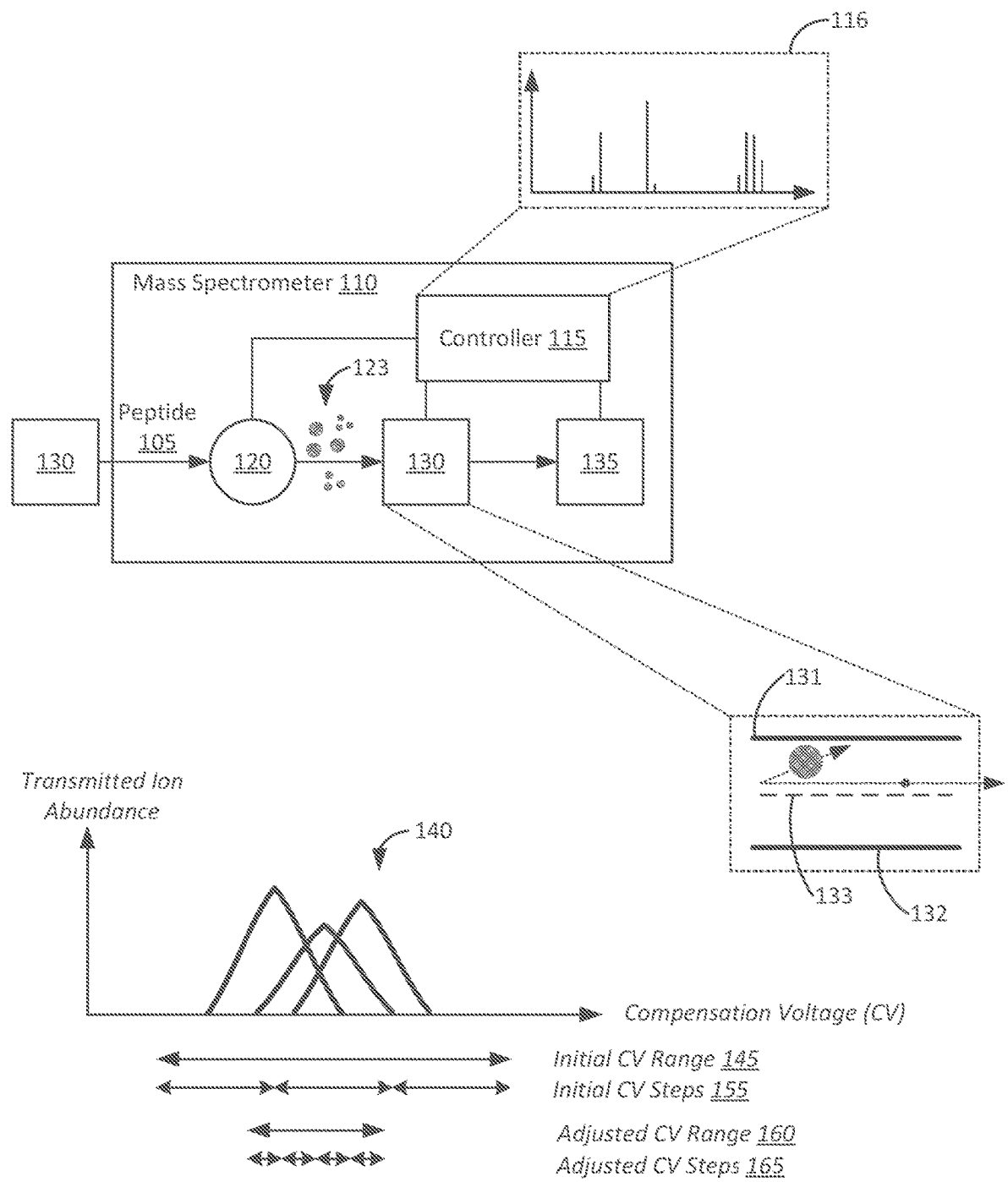
FIG. 1 illustrates an example of a mass spectrometer using ion mobility separation with adjusted compensation voltages.

Some of the material described in this disclosure includes devices and techniques for using ion mobility separation to improve throughput of a mass spectrometer. As used herein, the term "ion mobility separation" and its variants include any device or technique in which ions are separated or filtered on the basis of their mobility properties, and is intended to embrace both conventional ion mobility separation devices such as a drift tube in which ions travel through a drift gas at a rate determined by their mobilities, as well as differential mobility devices (such as the FAIMS device described below), in which ions are separated or filtered in accordance with their ratios of high field to low field mobilities.

In one example, a mixture including peptides is introduced into a chromatography system such that different peptides in the mixture are separated and introduced into a mass spectrometer for analysis at different times. As a peptide is introduced into the mass spectrometer, the peptide and other co-eluting substances are ionized using electrospray ionization (ESI) as an ion source to produce ions that are transported among the components of the mass spectrometer for mass analysis.

As described later in this disclosure, ion mobility separation can be performed following the production of the ions by the ESI ion source. The ion mobility separation can be performed by a field asymmetric-waveform ion-mobility spectrometry (FAIMS) device using a compensation voltage (CV) range to facilitate the transmission of desirable ions through the FAIMS device. The different CVs within the CV range can be cycled through, with each of the different CVs being a step size different than at least one other CV within the CV range, for example, a CV at 50 volts (V), a CV at 60 V, and a CV at 70 V being a 50-70 V CV range with a step size of 10 V. Thus, in the example, the CVs used by the FAIMS device would be 50 V, followed by 60 V, and followed by 70 V, before returning to repeat the 50 V, 60 V, and 70 V sequence.

The initial CV range and step size might be selected by an operator for the experiment, but as previously discussed, the optimal parameters of the CV (e.g., range and step size) might change. To compensate for these changes, the mass spectrometer system can first use the initial CV range and step size, and acquire data indicating the intensities of transmitted ion abundance with respect to the initial CVs. By analyzing the acquired data, an updated CV range, step size, or number of steps can be determined and used for the experiment. The updated CV range can be narrower (e.g., 55 V to 65 V rather than 50 V to 70 V) with a smaller step size (e.g., 5 V rather than 10 V) and more steps (e.g., five steps rather than three steps). By using one or more of updated CV range, step size, or number of steps, better experiment data can be acquired at increased throughput.

Also described in this disclosure is a time delay following the switch to another CV can be based on the step size. The time delay can represent the recovery time for the FAIMS device to allow the desired ions to enter and fully transmit through following the CV switch. For example, a smaller step size when switching between CVs can use a shorter time delay than a larger step size. By adjusting the time delay based on the step size, the throughput of the mass spectrometer is increased, as well as increased sensitivity.

Also described in this disclosure is an ordering of CVs with overlapping retention time windows to improve throughput. Scans can be performed over time based on a schedule in accordance with the retention times. Because there are overlapping targets (e.g., peptides or other molecules of interest) in shared retention times, the scans within the shared retention times can be in an order based on the CVs. The scans that are close to a same CV can be grouped or clustered such that the order of scans results in a reduction of switching CV step sizes and, therefore, lower time delays to increase throughput.

The three techniques described above involving adjustment of CV parameters, time delay based on step size of CVs, and scan ordering based on CVs can be implemented together to improve throughput and more thorough data acquisition. However, each of the techniques can be implemented individually, or in any combination with the others.

Figure 2:
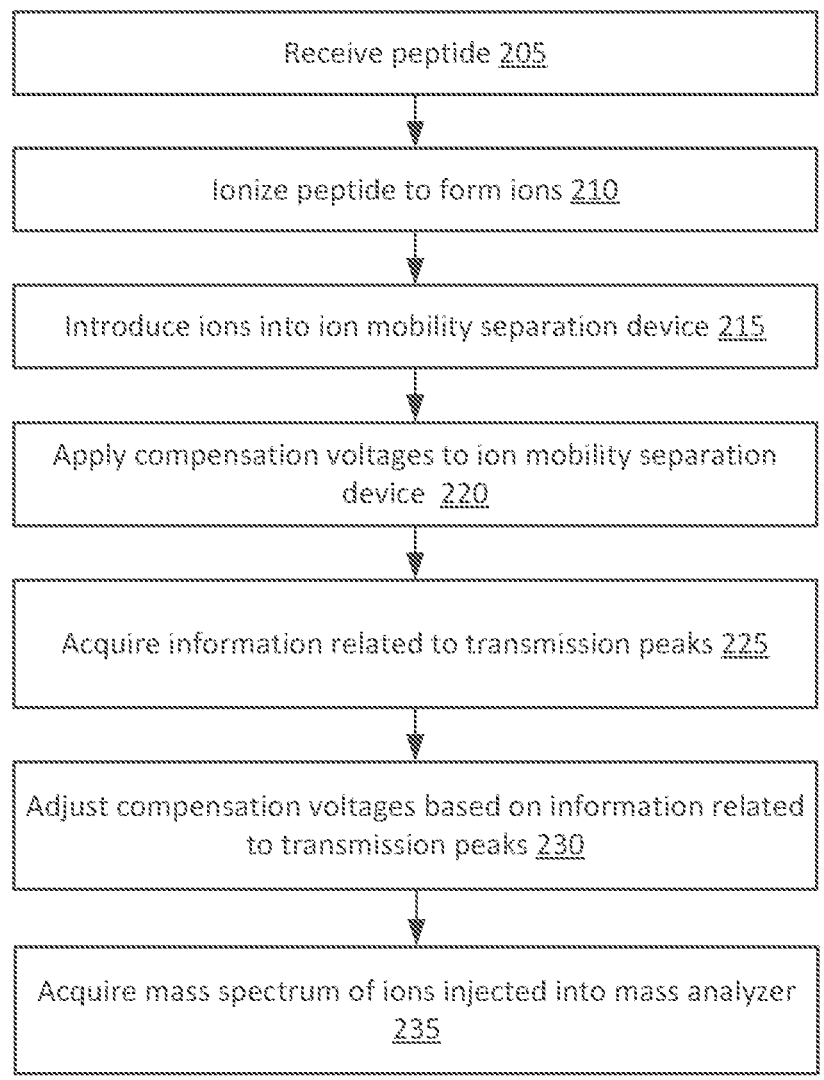
FIG. 2 illustrates an example of a block diagram for operating a mass spectrometer using ion mobility separation with adjusted compensation voltages.

In more detail, FIG. 1 illustrates an example of a mass spectrometer using ion mobility separation with adjusted compensation voltages. FIG. 2 illustrates an example of a block diagram for operating the mass spectrometer of FIG. 1.

In FIG. 2, a peptide is received by a mass spectrometer (205), the peptide is ionized to form ions (210), and the ions are introduced into an ion mobility separation device (215). For example, in FIG. 1, in the context of proteins subject to digestion, chromatography system 130 can be a liquid chromatography (LC) system that separates peptides such that different peptides or groups of peptides are provided to mass spectrometer 110 at different times. However, gas chromatography (GC), capillary electrophoresis (CE), or other types of systems used to separate components of a mixture can also be used.

Following separation by chromatography system 130, peptide 105 is introduced into ion source 120 of mass spectrometer 110. Ion source 120 ionizes a material under analysis (i.e., peptide 105) by removing or adding charge-carrying entities (e.g., hydrogen nuclei or electrons) to or from the material to provide the material with a positive or negative charge. This results in ions 123 forming from the ionization of peptide 105. Ion source 120 is usually of the ESI type, but may instead utilize any other suitable ionization technique, including atmospheric-pressure chemical ionization (APCI) or atmospheric pressure photoionization (APPI).

After ionization, ions 123 are provided to ion mobility separation device 130, which separates the ions based on their mobility properties in the presence of a buffer gas and exposure to an electric field. That is, rather than separating ions based on a mass-to-charge ratio, ion mobility separation device 130 separates ions by their mobility properties (e.g., their mobilities in a fixed field, or the ratio of their high field to low field mobilities). In FIG. 1, this is implemented using a high-field asymmetric waveform ion mobility spectrometry (FAIMS) device that is used as a filter.

A FAIMS device is depicted in a simplified example in FIG. 1 as having two parallel plates with electrode 131 and electrode 132, but some implementations include different geometries such as electrodes 131 and 132 as cylindrical electrodes with one disposed or positioned within the other electrode. Electrode 132 can be grounded (e.g., at 0 V) while a high-voltage asymmetric radio frequency (RF) signal is applied to electrode 131, or vice versa. The signal applied to electrode 131 is composed of two sine waves with different phases (e.g., one ninety degrees out-of-phase from the other) and different amplitudes such that they define a first portion that has a higher positive amplitude than a negative amplitude of a second portion (e.g., the first portion might range from 0 volts (V) to X V whereas the second portion might range from 0 V to −0.5 X V), but the first portion is asserted for a shorter time period than the second portion (e.g., the first portion might be asserted for t microseconds (μs) and the second portion might be asserted for 2 t μs). This results in the ions introduced into and transmitting within ion mobility separation device 130 to be subjected to an electric field that is higher-strength in one direction for a shorter period of time, but then switched to an electric field that is lower-strength in a second another direction for a longer period of time. Based on the differential mobilities of the ions in the different higher-strength and lower-strength electric fields, ions will generally drift towards one of the electrodes as they pass through ion mobility separation device 130.

In other types of IMS, mobility separates ions (due to the electric field not changing), whereas in FAIMS, the ions separate due to differences in mobility caused by the changing electric field. For example, during the lower-strength field, ions can drift similar to other types of IMS, but in the higher-strength electric field, ions drift due to a differential mobility that adds up via the periodicity of the RF signal. Thus, in IMS devices (including FAIMS), the mobility properties or parameters causes ions to be separated or filtered.

To account for the drift and allow selected ions to be able to transmit through without hitting one of the electrodes, a direct current (DC) compensation voltage (CV) is applied to electrode 131. The application of the CV counteracts the ion drift arising from the oscillatory field such that ions generally track path 133 and exit the ion separation device 130. If an appropriate CV is applied to electrode 131, then one type of ion might drift to and from path 133 but be able to transmit through ion mobility separation device 130. By contrast, if the CV applied does not correct for enough of the drift of another ion, then that ion might drift to and from path 133, but overall drift closer to one of the electrodes and eventually impact an electrode, thus resulting in that ion not transmitting through ion mobility separation device 130. By scanning or cycling through multiple CV values (i.e., applying CVs within a range of CVs), ions can be filtered through ion mobility separation device 130 in accordance with their relative mobilities. If the CV range does not include a CV for an ion with a particular relative mobility to transmit through, then ion mobility separation device 130 effectively acts as a filter for that ion. The CVs can be applied or scanned through via controller circuit 115, which can drive or provide signals to other circuitry for generating the appropriate CVs.

In some implementations, a conventional ion mobility separation device (e.g., ones using drift tubes) can employ gating mechanisms to separate, and even filter out ions.

Returning to FIG. 2, information related to transmission peaks of the ions is acquired (225). For example, in FIG. 1, peaks 140 represents the transmission of ions based on the CV that is used by ion mobility separation device 130. The information can be acquired or generated by controller circuit 115 using information from chromatography system 130, mass spectra generated by the mass spectrometer (as described later herein), or a combination of both. Initial CV range 145, for example, can range from −50 V to −80 V and initial CV steps 155 can be 10 V, indicating that CVs of −50 V, −60 V, −70 V, and −80 V are used to facilitate transmission of ions through ion mobility separation device 130.

As depicted, peaks 140 are clustered and overlapping in ion transmission at CV voltages within initial CV range 145. Ideally, the CVs used should correspond with each apex of peaks 140. However, the first CV within initial CV range 145 would not result in any ions transmitting as that voltage does not correspond with any portion of peaks 140. After the next CV step or jump (based on initial CV steps 155), the CV is close to the apex of the first of peaks 140, resulting in a high abundance of the corresponding ion transmitted. After the second CV step, the CV is close to the end of the middle peak and mid-way through the trailing side of the third peak. After the third CV step, the CV does not correspond to any portion of any of peaks 140. Thus, using initial CV range 145 and initial CV steps 155, a significant number of desirable ions are not transmitted.

In FIG. 2, the information related to the transmission peaks is used to adjust parameters of the CVs (230). For example, in FIG. 1, adjusted CV range 160 provides a change to initial CV range 145, and adjusted CV steps 165 provides a change to initial CV steps 165 that provide a more tuned or improved ion transmission performance for ion mobility separation device 130.

In contrast to initial CV range 145, adjusted CV range 160 is narrower, and is more focused or close to each apex of peaks 140. In contrast to initial CV steps 155, adjusted CV steps 165 are smaller (e.g., 3 V differences rather than 10 V differences), and more numerous (e.g., four steps resulting in five CVs to be applied rather than three steps resulting in four CVs to be applied). Thus, adjusted CV range 160 and adjusted CV steps 165 provide better performance than initial CV range 145 and initial CV steps 155 with a narrower CV range and more CV steps within the narrower range.

However, in some implementations, the CV range would be wider, or the CV steps can be reduced. For example, if a global optimum for the CV rather than a local optimum is used (e.g., if the CV is out-of-frame), or if the targeted or expected ions are not found, then the CV range might be wider or the CV steps might be reduced.

Adjusted CV range 160 and adjusted CV steps 165 can be determined based on an analysis of peaks 140 and the use of initial CV range 145 and initial CV steps 155. Based on the use of initial CV range 145 and initial CV steps 155 as a start, CVs closest to the apexes can be selected, regression or interpolation splines or kernel methods can be used, or the shapes of peaks 140 can be determined and used to generate adjusted CV range 160 and adjusted CV steps 165 with CVs at or close to each of the apex.

Thus, in an experiment, initial CV range 145 and initial CV steps 155 can be manually input as a starting point into the computing system of mass spectrometer 110, but adjusted CV range 160 and adjusted CV steps 165 can be determined as improved selections from the starting point. Adjusted CV range 160 and adjusted CV steps 165 can then be provided as a recommendation, or automatically used. As a result, a different CV range and a different number of steps (of CV voltages) is used from what was initially provided, improving performance.

In FIG. 2, mass spectra of the ions injected to a mass analyzer are then acquired (235). For example, in FIG. 1, using adjusted CV range 160 and adjusted CV steps 165, ions are transmitted through ion mobility separation device 130 and afterwards via a variety of components including ion optics, mass filters, fragmentation cells, etc. and eventually to mass analyzer 135. Signals indicating the detected ions are provided to controller 115, and mass spectra including mass spectrum 116 are generated.

Figure 3:
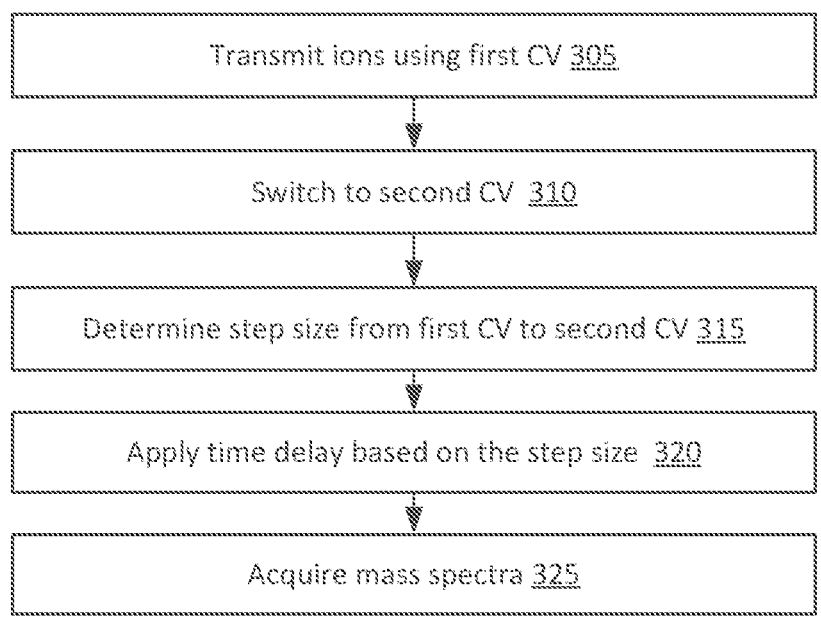
FIG. 3 illustrates an example of a block diagram for adjusting a time delay based on a CV step size.

As previously discussed, a time delay based on a size of the CV step can be adjusted to further improve throughput and sensitivity. FIG. 3 illustrates an example of a block diagram for adjusting a time delay based on a CV step size. In FIG. 3, ions are transmitted through the ion mobility separation device at a first CV (305). For example, in FIG. 1, the first CV of adjusted CV range 160 is applied to ion mobility separation device 130 to transmit a first type or class of ions.

Next, in FIG. 3, the first CV is switched to a second CV (310). For example, in FIG. 1, the second CV of adjusted CV range 160 is applied, which is one CV step from the first CV, in accordance with adjusted CV steps 165. By switching from the first CV to the second CV, the ions transmitting through ion mobility separation device 130 can be different and, therefore, a time delay, or recovery time, might be needed for another class of ions that can fully transmit through ion mobility separation device 130 under the new, second CV.

A default or initial time delay can be set to the interscan time of the mass spectrometer, and typically the same time delay is applied following each CV jump in other scenarios. However, if the jump from the first CV to the second CV is small (i.e., a small CV step size, or small voltage difference between the first CV to the second CV), then the time delay needed can be less than the interscan time. Thus, by changing the time delay following each CV jump through the CV range based on the step size, the throughput of the mass spectrometer can increase. In FIG. 3, the step size from the first CV to the second CV is determined (315), and a time delay based on the step size is applied (320). Following or upon the time delay, mass spectra are acquired (325). That is, the second CV is then applied to ion mobility separation device 130, and mass spectra representative of another class of ions is acquired following or upon the time delay after applying the second CV.

In some implementations, the time delay applied is different than a default time delay if the step size is within a threshold step size range. For example, the interscan time might be sufficient for the time delays needed for step sizes greater than or equal to 20 V. Thus, any CVs applied at a step size greater than or equal to 20 V can result in the default time delay being used. By contrast, step sizes less than 20 V can result in a different time delay than the default time delay being used, the magnitude of the different time delay dependent upon the step size. The smaller the step size, the lower the time delay. Therefore, a 1 V step size would result in a lower time delay needed than a 10 V step size. Likewise, a 0.5 V step size would result in a lower time delay than the 1 V step size. Data indicating the time delay for the step sizes can be stored in a memory circuit accessible or within controller circuit 115.

In some implementations, the history of CV jumps can also be used to determine the time delay. For example, a sequential series of small CV jumps might result in the ion mobility separation device not recovering in time to allow for new classes of ions to transmit through. This can occur due to a possible non-linear dependence of the time delay to the CV jumps. Accordingly, information (e.g., empirically derived) can be stored in memory accessible by controller circuit 115 indicating a number of jumps at a particular CV step size at which extra "padding" time might be applied to the time delay. Thus, the time delay following a switch to a second CV at a specific step size might be less than the time delay following a switch to the tenth CV at the same specific step size.

Figure 4:
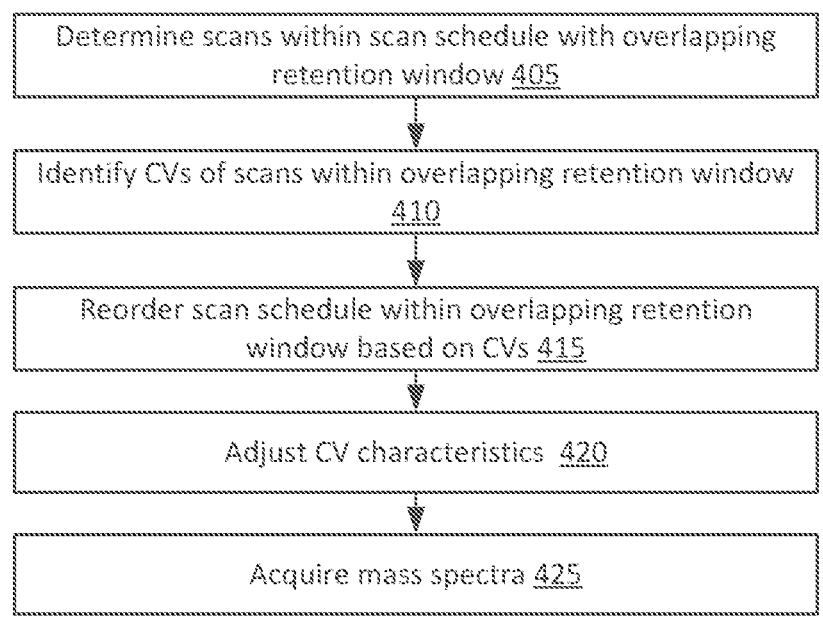
FIG. 4 illustrates an example of a block diagram for ordering of CVs with overlapping retention time windows.

Typically, controller 115 of mass spectrometer 110 generates a schedule of scans at different times based on retention times of peptides. As previously mentioned, the schedule of scans can be ordered based on the CVs within overlapping retention time windows to also improve performance. FIG. 4 illustrates an example of a block diagram for ordering of CVs with overlapping retention time windows.

In FIG. 4, scans with overlapping retention windows of a scan schedule can be determined (405). For example, scans can be initiated by controller circuit 115 in FIG. 1, which is programmed to operate the components of the mass spectrometer in the form of a schedule of scans to be performed over time. In particular, the scans are operated in order of retention times such that the appropriate functionality (e.g., selecting the appropriate m/z range, etc.) is performed by the mass spectrometer when a particular peptide is expected to elute from the chromatography system and provided to the mass spectrometer. The schedule might indicate a variety of scans, many with overlapping times, or within the same or shared retention time window.

Upon identification of the scans within overlapping retention windows, the CVs for the scans are identified (410), and the schedule is reordered based on the CVs (415). For example, the scans can be ordered such that the CVs to be used by the ion mobility separation device are in descending or ascending order within the same overlapping retention time window. By reordering in order of descending or ascending CVs, the step size can be reduced.

Returning to FIG. 4, the CV parameters can also be adjusted (420). For example, the adjusted CV range or adjusted CV steps to be used by one or more of the scans can be changed to facilitate improved throughput. This can be performed by identifying small differences between CV values within the adjusted CV ranges (at values in accordance with the corresponding adjusted CV steps). For example, if three consecutive scans within the reordered schedule are 0.1 V from each other in terms of the initial CV of the adjusted CV range, such as 39.1 V, 39.2 V, and 39.3 V, then each of those three scans can have the adjusted CV range start at 39.2 V. This would result in no or little need for a time delay, while maintaining high performance due to only slight differences in ion transmissions from the previous CVs. Thus, scans with overlapping retention time windows and similar CVs can include adjusting one or more of their CVs to make them the same (e.g., take the average, take the median, etc.) to increase throughput of the mass spectrometer. Using the new schedule, mass spectra can then be acquired (425).

Many of the examples describe implementations with liquid chromatography (LC) for separating peptides. However, other types of mixture separation can be used including gas chromatography (GC) or capillary electrophoresis (CE).

The examples describe techniques for peptides, however, other biomolecules can be used with the techniques described herein. For example, in addition to proteins and their peptides, other types of biomolecules that can be used with the techniques include lipids, nucleic acids, metabolites, oligosaccharides, polysaccharides, and the like. Moreover, other large molecules other than biomolecules can be used, in addition to small molecules.

The examples described herein include using mass analyzer that can be implemented using an orbital electrostatic trap mass analyzer, quadrupole, ion traps, time-of-flight (TOF) analyzers, or other types of mass analyzer might be used. In another example, a tandem mass spectrometer might be used in which precursor ions are fragmented to form product ions.

Figure 5:
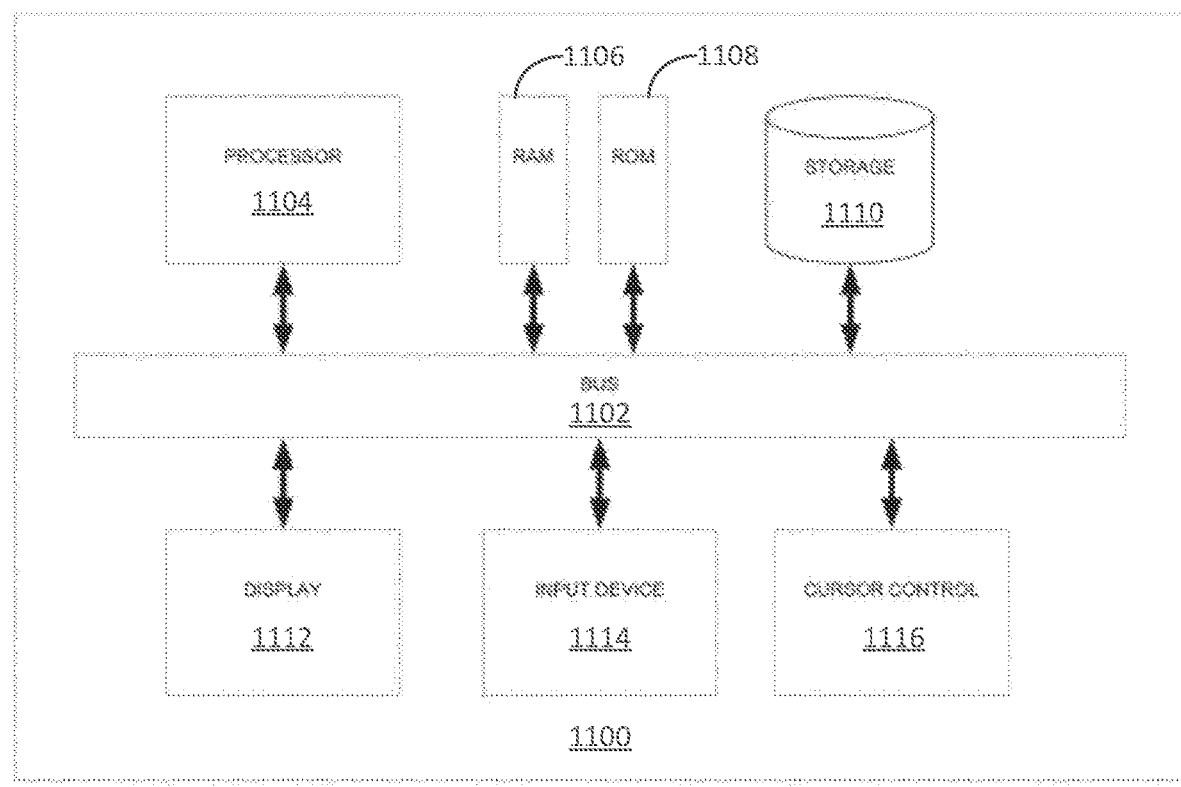
FIG. 5 illustrates an example of an electronic device which may be used to implement some of the examples.

FIG. 5 illustrates an example of an electronic device which may be used to implement some of the implementations. In some implementations, the electronic device of FIG. 5 can store or use a computer program product including one or more non-transitory computer-readable media having computer programs instructed stored therein, the computer program instructions being configured such that, when executed by one or more computing devices, the computer program instructions cause the one or more computing devices to perform he techniques described herein.

In FIG. 5, computer system 1100 can implement any of the methods or techniques described herein. For example, computer system 1100 can implement controller 115 in FIG. 1. Thus, the operation of components of the associated mass spectrometer may be adjusted in accordance with calculations or determinations made by computer system 1100. In various embodiments, computer system 1100 can include a bus 1102 or other communication mechanism for communicating information, and a processor 1104 coupled with bus 1102 for processing information. In various embodiments, computer system 1100 can also include a memory 1106, which can be a random-access memory (RAM) or other dynamic storage device, coupled to bus 1102, and instructions to be executed by processor 1104. Memory 1106 also can be used for storing temporary variables or other intermediate information during execution of instructions to be executed by processor 1104. In various embodiments, computer system 1100 can further include a read only memory (ROM) 1108 or other static storage device coupled to bus 1102 for storing static information and instructions for processor 1104. A storage device 1110, such as a magnetic disk or optical disk, can be provided and coupled to bus 1102 for storing information and instructions.

In various embodiments, computer system 1100 can be coupled via bus 1102 to a display 1112, such as a cathode ray tube (CRT) or liquid crystal display (LCD), for displaying information to a computer user. An input device 1114, including alphanumeric and other keys, can be coupled to bus 1102 for communicating information and command selections to processor 1104. Another type of user input device is a cursor control 1116, such as a mouse, a trackball or cursor direction keys for communicating direction information and command selections to processor 1104 and for controlling cursor movement on display 1112. This input device typically has two degrees of freedom in two axes, a first axis (i.e., x) and a second axis (i.e., y), that allows the device to specify positions in a plane.

A computer system 1100 can perform the techniques described herein. Consistent with certain implementations, results can be provided by computer system 1100 in response to processor 1104 executing one or more sequences of one or more instructions contained in memory 1106. Such instructions can be read into memory 1106 from another computer-readable medium, such as storage device 1110. Execution of the sequences of instructions contained in memory 1106 can cause processor 1104 to perform the processes described herein. In various embodiments, instructions in the memory can sequence the use of various combinations of logic gates available within the processor to perform the processes describe herein. Alternatively hardwired circuitry can be used in place of or in combination with software instructions to implement the present teachings. In various embodiments, the hard-wired circuitry can include the necessary logic gates, operated in the necessary sequence to perform the processes described herein. Thus implementations described herein are not limited to any specific combination of hardware circuitry and software.

The term "computer-readable medium" as used herein refers to any media that participates in providing instructions to processor 1104 for execution. Such a medium can take many forms, including but not limited to, non-volatile media, volatile media, and transmission media. Examples of non-volatile media can include, but are not limited to, optical or magnetic disks, such as storage device 1110. Examples of volatile media can include, but are not limited to, dynamic memory, such as memory 1106. Examples of transmission media can include, but are not limited to, coaxial cables, copper wire, and fiber optics, including the wires that comprise bus 1102.

Common forms of non-transitory computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, PROM, and EPROM, a FLASH-EPROM, any other memory chip or cartridge, or any other tangible medium from which a computer can read.

In accordance with various embodiments, instructions configured to be executed by a processor to perform a method are stored on a computer-readable medium. The computer-readable medium can be a device that stores digital information. For example, a computer-readable medium includes a compact disc read-only memory (CD-ROM) as is known in the art for storing software. The computer-readable medium is accessed by a processor suitable for executing instructions configured to be executed.

In various embodiments, the methods of the present teachings may be implemented in a software program and applications written in conventional programming languages such as C, C++, etc.

While the techniques are described in conjunction with various implementations or embodiments, it is not intended that the techniques be limited to such embodiments. On the contrary, the techniques encompass various alternatives, modifications, and equivalents, as will be appreciated by those of skill in the art.

Further, in describing various embodiments, the specification may have presented a method and/or process as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process should not be limited to the performance of their steps in the order written, and one skilled in the art can readily appreciate that the sequences may be varied and still remain within the spirit and scope of the various embodiments.

The embodiments described herein, can be practiced with other computer system configurations including hand-held devices, microprocessor systems, microprocessor-based or programmable consumer electronics, minicomputers, mainframe computers and the like. The embodiments can also be practiced in distributing computing environments where tasks are performed by remote processing devices that are linked through a network.

It should also be understood that the embodiments described herein can employ various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing.

Any of the operations that form part of the embodiments described herein are useful machine operations. The embodiments, described herein, also relate to a device or an apparatus for performing these operations. The systems and methods described herein can be specially constructed for the required purposes or it may be a general-purpose computer selectively activated or configured by a computer program stored in the computer. In particular, various general-purpose machines may be used with computer programs written in accordance with the teachings herein, or it may be more convenient to construct a more specialized apparatus to perform the required operations.

Certain embodiments can also be embodied as computer readable code on a computer readable medium. The computer readable medium is any data storage device that can store data, which can thereafter be read by a computer system. Examples of the computer readable medium include hard drives, network attached storage (NAS), read-only memory, random-access memory, CD-ROMs, CD-Rs, CD-RWs, magnetic tapes, and other optical and non-optical data storage devices. The computer readable medium can also be distributed over a network coupled computer systems so that the computer readable code is stored and executed in a distributed fashion.

We claim:

1. A mass spectrometry system comprising:
    an ionization source configured to receive a sample and form ions from the sample;
    a field asymmetric-waveform ion-mobility spectrometry (FAIMS) device configured to receive the ions; and
    a controller configured to acquire peak information related to transmission of the ions through the FAIMS device based on initial compensation voltage (CV) parameters used for the FAIMS device, and the controller configured to adjust the initial CV parameters based on the peak information to generate adjusted CV parameters used by the FAIMS device, the adjusted CV parameters being one or more of: a CV range different than the initial CV parameters, a number of CV steps within the CV range different than the initial CV parameters, or a CV step size between CV values of the CV range different than the initial CV parameters, and wherein the adjusted CV parameters includes more steps within the CV range than the initial CV parameters.

2. The mass spectrometry system of claim 1, wherein the adjusted CV parameters includes a narrower CV range than the initial CV parameters.

3. The mass spectrometry system of claim 1, wherein the adjusted CV parameters includes a smaller CV step size than the initial CV parameters.

4. The mass spectrometry system of claim 1, wherein the controller is further configured to apply a time delay based on the CV step size.

5. The mass spectrometry system of claim 1, wherein the controller is further configured to generate a scan schedule ordering scans based on the adjusted CV parameters.

6. The mass spectrometry system of claim 5, wherein the scan schedule is ordered based on ascending or descending CV values of each of the scans within an overlapping retention time window.

7. The mass spectrometry system of claim 5, wherein the scan schedule includes a first scan having a first CV value within the CV range, and a second scan having a second CV value within the CV range, and the controller is configured to determine that the first CV value and the second CV value are within a threshold range of each other, and the controller is configured to modify one or both of the first CV value or the second CV value to be the same as the other.

8. A method of operating a mass spectrometer comprising:
acquiring, by a processor, peak information indicative of transmissions of ions through an ion mobility device using first compensation voltage (CV) parameters;
determining, by the processor, second CV parameters based on the peak information, the second CV parameters being different from the first CV parameters by one or more of: a CV range, a number of CV steps within the CV range, or a CV step size between CV values of the CV range, and wherein the number of CV steps within the CV range of the second CV parameters is more than the number of CV steps of the first CV parameters;
applying the second CV parameters to the ion mobility device; and
acquiring mass spectra using the ion mobility device applied with the second CV parameters.

9. The method of claim 8, wherein the CV range of the second CV parameters is smaller than the CV range of the first CV parameters.

10. The method of claim 8, wherein the CV step size of the second CV parameters is smaller than the CV step size of the first CV parameters.

11. The method of claim 8, wherein applying the second CV parameters to the ion mobility device includes applying a time delay before acquisition of the mass spectra, the time delay based on the CV step size.

12. The method of claim 8, the method further comprising:
generating a scan schedule ordering scans based on the second CV parameters, the scan schedule ordering scans based on ascending or descending CV values of each of the scans within an overlapping retention time window, and wherein acquiring the mass spectra is based on the scan schedule.

13. The method of claim 12, wherein the scan schedule includes a first scan having a first CV value within the CV range, and a second scan having a second CV value within the CV range, and generating the scan schedule includes:
determining that the first CV value and the second CV value are within a threshold range; and
modifying one or both of the first CV value or the second CV value to be the same as the other.

14. A mass spectrometry system comprising:
an ion mobility device configured to transmit ions; and
a controller circuit configured to acquire transmission information indicative of the ions transmitting through the ion mobility device based on use of first compensation voltage (CV) parameters, configured to generate second CV parameters different than the first CV parameters, and configured to use the second CV parameters to facilitate the transmission of the ions through the ion mobility device, the second CV parameters being different than the first CV parameters by one or more of: a CV range, a number of CV steps within the CV range, or a CV step size among CV values used within the CV range, wherein the number of CV steps of the second CV parameters is hither than the number of CV steps for the first CV parameters.

15. The mass spectrometry system of claim 14, wherein the CV range of the second CV parameters is narrower than the CV range of the first CV parameters.

16. The mass spectrometry system of claim 14, wherein the CV step size of the second CV parameters is smaller than the CV step size of the first CV parameters.

17. The mass spectrometry system of claim 14, wherein the controller circuit is further configured to acquire a mass spectrum of the ions transmitting through the ion mobility device following a time delay applied that has a magnitude based on the CV step size of the second CV parameters.

18. The mass spectrometry system of claim 14, wherein the controller circuit is further configured to generate a scan schedule ordering scans based on the second CV parameters.

19. The mass spectrometry system of claim 18, wherein generating the scan schedule includes:
identifying scans within the scan schedule having overlapping retention time windows;
identifying CVs of the scans identified as having overlapping retention time windows; and
reordering the scan schedule based on the identification of the CVs.

20. The mass spectrometry system of claim 19, wherein reordering the scan schedule includes ordering the scans based on ascending or descending CV values.

21. The mass spectrometry system of claim 19, wherein the scan schedule includes a first scan having a first CV value within the CV range, and a second scan having a second CV value within the CV range, and the controller is configured to determine that the first CV value and the second CV value are within a threshold range, and the controller is configured to modify one or both of the first CV value or the second CV value based on the determination that the first CV value and the second CV value are within the threshold range.

22. A computer program product including one or more non-transitory computer-readable media having computer programs instructed stored therein, the computer program instructions being configured such that, when executed by one or more computing devices, the computer program instructions cause the one or more computing devices to:

acquire peak information indicative of transmissions of ions through an ion mobility device using first compensation voltage (CV) parameters;
determine second CV parameters based on the peak information, the second CV parameters being different from the first CV parameters by one or more of: a CV range, a number of CV steps within the CV range, or a CV step size between CV values of the CV range, wherein the number of CV steps of the second CV parameters is higher than the number of CV steps for the first CV parameters;
apply the second CV parameters to the ion mobility device; and
acquire mass spectra using the ion mobility device applied with the second CV parameters.

* * * * *